United States Patent [19]

Hirschmann

[11] Patent Number: 4,913,613
[45] Date of Patent: Apr. 3, 1990

[54] LINEAR UNIT FOR AN ASSEMBLY DEVICE IN HANDLING TECHNOLOGY

[76] Inventor: Gregory C. Hirschmann, Rautistrasse 12, Zurich, Switzerland

[21] Appl. No.: 214,330

[22] Filed: Jul. 1, 1988

[30] Foreign Application Priority Data

Jul. 10, 1987 [CH] Switzerland .................. 2639/87

[51] Int. Cl.⁴ .................................................. B25J 11/00
[52] U.S. Cl. ..................................... 414/751; 414/918; 901/22; 901/37
[58] Field of Search ............ 414/751, 752, 753, 744.6, 414/744.8, 918; 901/16, 17, 18, 22, 37; 212/268

[56] References Cited

U.S. PATENT DOCUMENTS

| | | | |
|---|---|---|---|
| 3,214,033 | 10/1965 | Nilsson | 414/918 X |
| 3,522,838 | 8/1970 | Ott | 414/753 X |
| 3,734,303 | 5/1973 | Blatt | 414/753 |
| 3,744,032 | 7/1973 | Engelberger et al. | 901/22 X |
| 3,935,950 | 2/1976 | Burch | 414/744.6 X |
| 4,484,293 | 11/1984 | Minucciani et al. | 901/16 X |
| 4,507,045 | 3/1985 | Valentine et al. | 414/753 |
| 4,516,476 | 5/1985 | Beaton | 414/749 |
| 4,595,334 | 6/1986 | Sharon | 901/37 X |
| 4,632,632 | 12/1986 | Simone | 901/37 X |
| 4,752,094 | 6/1988 | Tabeau | 901/37 X |
| 4,767,257 | 8/1988 | Kato | 414/918 X |

FOREIGN PATENT DOCUMENTS

| | | |
|---|---|---|
| 8601444 | 7/1987 | Fed. Rep. of Germany . |
| 2566847 | 1/1986 | France . |
| 0221116 | 4/1985 | German Democratic Rep. ... 901/22 |

*Primary Examiner*—Frank E. Werner
*Assistant Examiner*—William M. Hienz
*Attorney, Agent, or Firm*—Helfgott & Karas

[57] ABSTRACT

A linear unit, particularly for a handling technology assembly device operatively connected to an external energy source and an external signal generator is proposed. The linear unit comprises a casing, a control valve incorporated into the casing, an actuator formed as a piston/cylinder unit and at least one guide device provided with a guide tube extended axially in parallel with the piston rod. In order to provide a closed pneumatic or hydraulic energy supply to the linear unit, the piston/cylinder unit is operatively connected by a first duct system integrated into the casing and by a second duct system integrated into the casing and the guide device to a mounting element which carries a gripper. The electric power can be supplied from the control valve via cables integrated into the casing and a second guide tube to the mounting element.

10 Claims, 2 Drawing Sheets

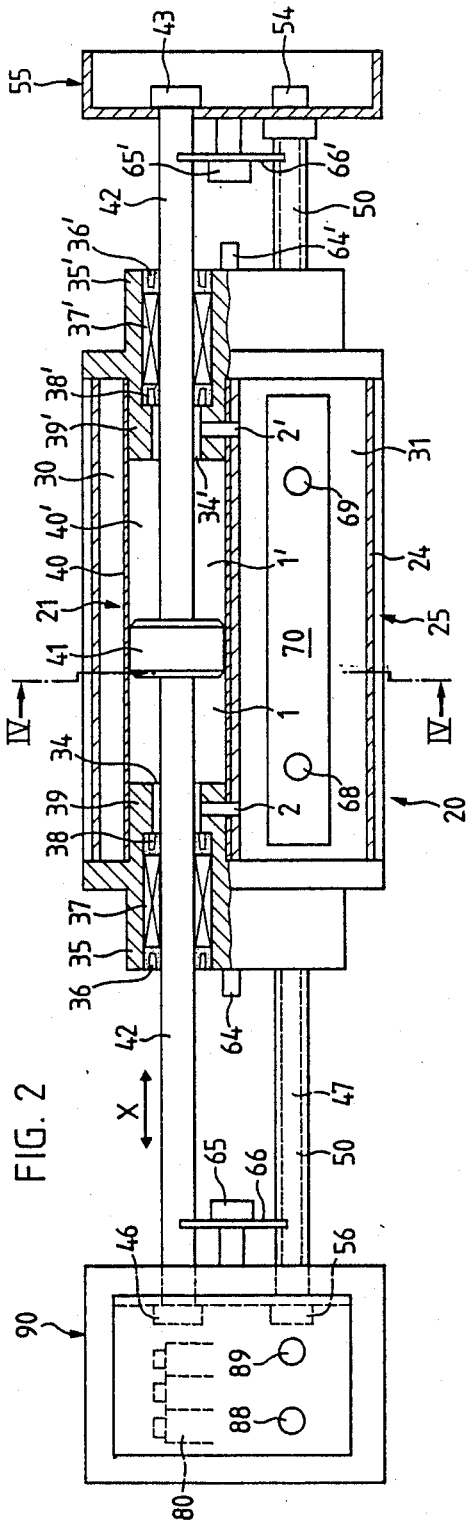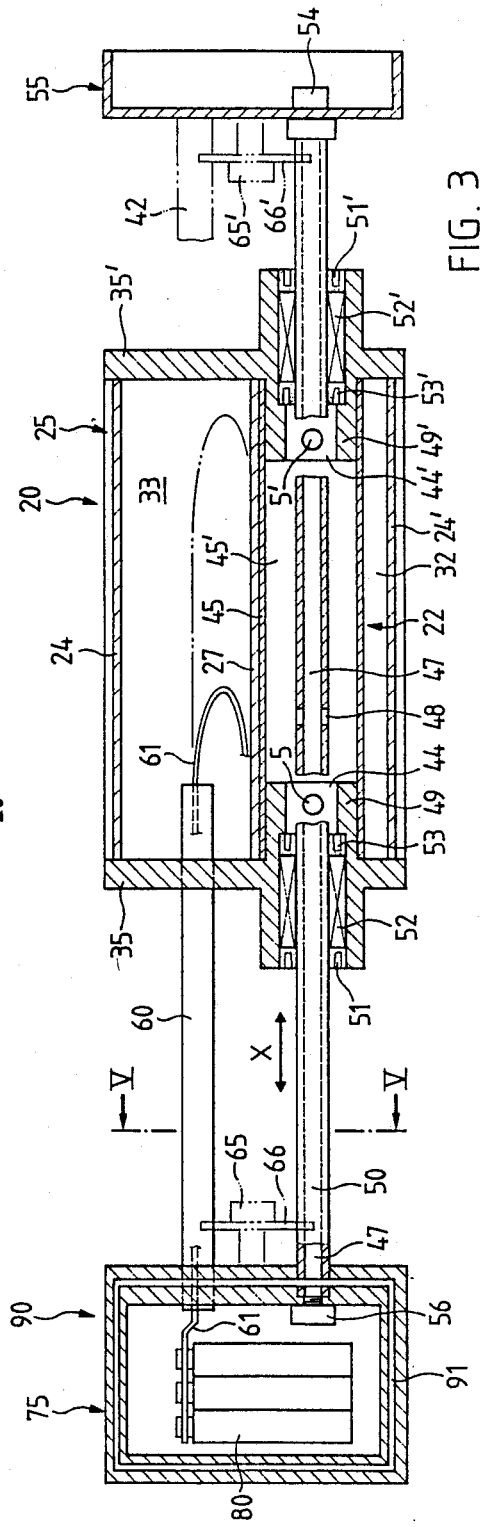

LINEAR UNIT FOR AN ASSEMBLY DEVICE IN HANDLING TECHNOLOGY

BACKGROUND OF THE INVENTION

The invention relates to a linear unit, particularly for an assembly device electrically/pneumatically or electrically/hydraulically operatively connected to an energy source.

Linear unit of the type under discussion comprises a casing, an actuator with a cylinder tubular body, a piston and a piston rod, and guide means with at least one guide tube axially parallel to the piston rod for cooperating with a mounting element to be correspondingly controlled, whereby on the mounting element is placed a gripper or the like element for performing movement and/or handling sequences.

For the automation of random, e.g. signal dependent-given movements and/or handling sequences, assembly devices are known with linear units operable by an associated energy source and associated mounting elements (e.g. rotary drives, clamping/gripping tongs or the like). The electric/ pneumatic or electric/hydraulic energy supply of the linear unit and the correspondingly associated mounting elements takes place by means of externally arranged control members (control valves) and cables or hoses largely exposed, on the one side, between the casing and a mounting flange for the mounting elements and, on the other side, spirally wound between the casing and an end piece and which can be damaged during fitting and installation work.

In another known assembly device for combining several functional units, including also a second linear unit for vertical movement, a rotary or pivoting unit for the gripper, etc., in conjunction with the first linear unit for the necessary air supply, is provided an additional unit, which is, however, relatively complicated in manufacture and maintenance and is arranged on the casing of the linear unit and is provided with integrated, telescopically longitudinally adjustable tubes. The additional unit provided with a corresponding number of telescopic tubes for additional, required movement functions can only be used to a limited extent.

SUMMARY OF THE INVENTION

It is an object of the present invention to obtain a closed energy supply for a linear unit and its peripheral equipment. This and other objects of the invention are attained by the linear unit and the mounting element which, for the electric/pneumatic or electric/hydraulic energy supply, are operatively connected with a control valve arranged in the casing in such a way that (a) an actuator constructed as a piston/cylinder unit can be supplied with pneumatic or hydraulic energy by means of a first duct system integrated into a casing of the linear unit, (b) a mounting element can be supplied with pneumatic or hydraulic energy by means of a second duct system also integrated into the casing and in guide means, and (c) electric power can be supplied to the mounting element by means of an operatively connected cable or the like integrated into a second guide tube and therefore substantially linearly adjustable.

BRIEF DESCRIPTION OF THE DRAWING

FIG. 2 is a side view, partially in section, of the linear unit for the assembly device according to FIG. 1;

FIG. 3 is a cross-sectional view through the linear unit according to FIG. 2, taken in a sectional plane parallel to that of FIG. 2;

DETAILED DESCRIPTION OF THE PREFERRED EMBODIMENT

Figure 1:
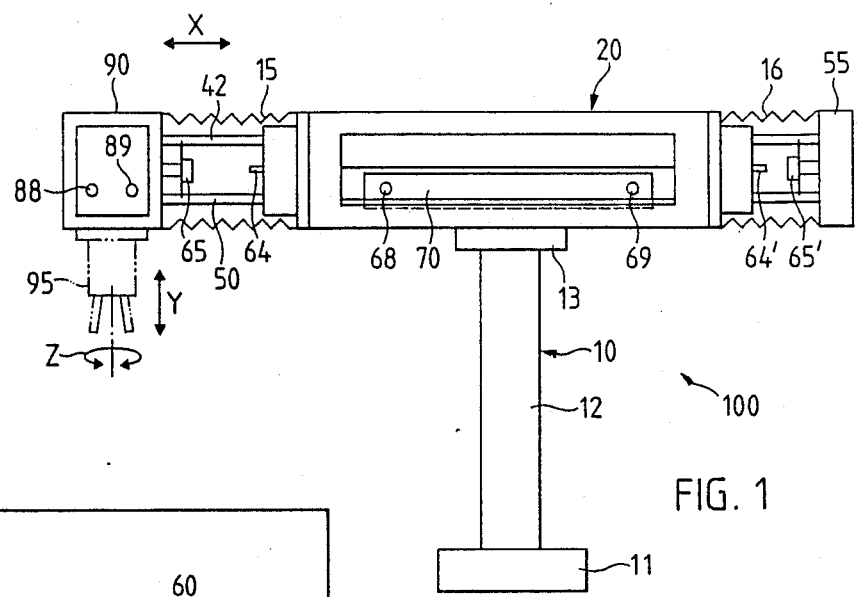
FIG. 1 is a schematic side view of the assembly device according to the invention.

FIG. 1 shows an assembly unit 100, which serves to automate given movement and/or handling sequences in assembly installations, production lines, etc. The assembly device 100 diagrammatically shown in stand-like construction essentially comprises a stand 10, which comprises a stand base 11, a standard 12 and a carrier element 13, which is constructed for the reception of a linear unit 20, which is detachably fixed by any suitable but not shown means to the carrier element 13. The standard 12 of stand 10 can be vertically adjusted in a not shown, known manner, so that the linear unit 20 can be also vertically adjusted and adapted to requirements. FIG. 1 also shows a mounting element 90 operatively connected to the linear unit 20, as well as a gripper 95 arranged thereon. Between linear unit 20 and mounting element 90, on the one hand, and linear unit 20 and end piece 55, on the other hand, is in each case provided a bellows 15, 16 for the protection of actuating and guide elements. Each bellows is fixed at its two ends by non-shown known means.

The linear unit 20 shown in side view in FIG. 2 comprises a casing 25, which is substantially closed at one side by a first flange 35 and, at the other side, by a second flange 35'. The two flanges 35, 35' are fixed to casing 25 by non-shown fixing means and have connecting pieces 39, 39' projecting axially into casing 25. The first two connecting pieces 39, 39' are interconnected by a first tubular body 40, which is sealingly mounted in not shown, known manner on the external diameter of the particular connecting piece 39, 39'. In the axial direction, each of the two first connecting pieces 39, 39' is formed with a bore 34, 34' for mounting a piston rod 42. Piston rod 42 connected with a piston 41 sealingly guided along an inner wall 40' of tubular member 40 is mounted in two connecting pieces 39, 39' provided in each case in the front region with one linear bearing 37, 37' and seals 36, 36' and 38, 38'. Piston rod 42 is displaceably guided in the direction of arrow X. Parts 40, 41 and 42 essentially form an actuator 21 for the linear movement of mounting element 90 in the direction of arrow X. Piston 41 separates cylinder chambers 1 and 1' from each other. These chambers are connectable via bores 2, 2' with a control valve 70 as will be explained herein below.

FIG. 3 shows the linear unit 20 in another sectional plane and it is possible to see the casing 25 sealed by means of the two lateral flanges 35, 35'. In the plane of section shown in FIG. 3, the two flanges 35, 35' are provided with second connecting pieces 49, 49' directed into casing 25 and constructed for receiving a guide tube 50. The two second connecting pieces 49, 49' are interconnected by a tubular member 45, which is sealingly mounted in a nonshown manner on the external diameter of the two connecting pieces 49, 49' which are axially penetrated, in each case, by one bore 44, 44' for the mounting of the guide tube 50 centrally arranged in tubular member 45. Bores 44, 44' are connected to bores 5, 5', to which connection bores lead from the control valve 70. Guide tube 50 is linearly displaceably guided in arrow direction X in the second connecting pieces 49, 49' provided in each case with a linear bearing 52, 52', as well as seals 51, 51' and 53, 53', as is piston rod 42 in the first connecting pieces 39, 39'. Above the first guide tube 50, a second tube 60 is arranged in flange 35. Tube 60 serves as a second guide and also receives an electric line 61, preferably an elastic flat band cable.

As is also shown in FIGS. 2 and 3, on one side of the linear unit 20, is arranged the mounting element 90 operatively connected to the piston rod 42 and the first guide tube 50, as well as with the second guide tube 60, whilst on the other side of the linear unit 20 is provided the end piece 55 operatively connected to piston rod 42 and the first guide tube 50. The two parts 90 and 55 are operatively connected by means of screws 43, 46 to piston rod 42 and by means of screws 54, 56 to guide tube 50. Screws 54 and 56 are preferably constructed as closure elements for the guide tube 50 axially penetrated by a through-bore 47.

The mounting element 90 shown diagrammatically and in a sectional view in FIG. 3 has a casing 75 having a duct system 91 and constructed for receiving control valves 80, particularly for receiving electrically/pneumatically or electrically/hydraulically operable micro-control valves. Micro-valves 80 are operatively connected, on the one hand, by means of cable 61 guided in tube 60, electrically, and, on the other hand, pneumatically or hydraulically by means of a yet to be described duct system, to the linear unit 20. Casing 75 of mounting element 90 can be constructed for receiving and fixing a second, non-shown linear unit for a further movement in the direction indicated by arrow Y in FIG. 1, or for fixing the gripper 95, shown diagrammatically by dot-dash lines in FIG. 1. A connection 89 for a corresponding energy supply and a plug 88 for a further electrical connection are provided laterally on casing 75. Gripper 95 is fixed so as to be pivotable and/or rotatable in arrow direction Z either on casing 75, or on a second, non-shown linear unit.

Figure 4:
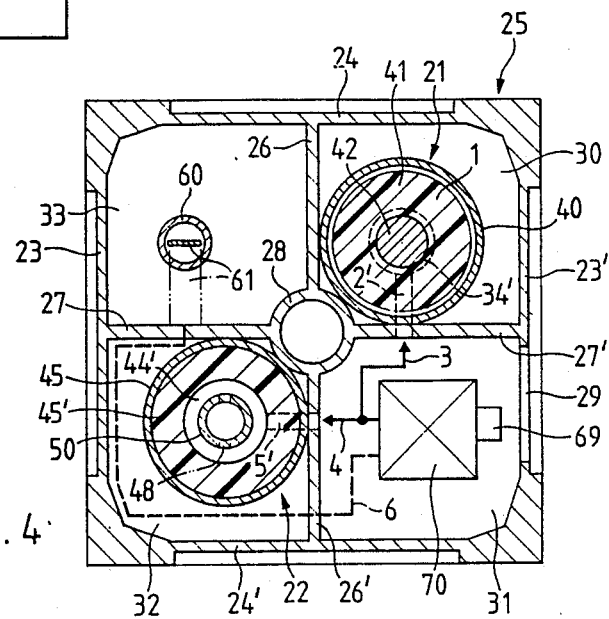
FIG. 4 is a section taken along line IV—IV of FIG. 2, on enlarged scale.

FIG. 4 shows on a larger scale a section along line IV—IV of FIG. 2. As seen the casing 25 of linear unit 20 essentially comprises side walls 23, 23', a top 24 and a bottom 24'. By means of two vertical partitions 26, 26'and two horizontal partitions 27, 27', casing 25 is subdivided into four chambers 30, 31, 32, 33, whereby partitions 26, 26' and 27, 27' are shaped to merge into a connecting part 28 oriented in the axial direction of casing 25 and into the walls 23, 23' and members 24, 24'. Connecting part 28 is tubular, on the one hand, for stabilizing casing 25 and, on the other hand, for receiving further elements.

The first chamber 30 of casing 25 serves to receive the actuator 21 comprising tubular member 40, piston 41 and piston rod 42, by means of which the linear movement of mounting element 90 with gripper 95 in the direction of arrow X (FIGS. 1 to 3) is produced. In the second chamber 31 arranged below the first chamber 30 and provided with a window 29 is arranged in exemplified manner a diagrammatically shown electrically/pneumatically operable control valve 70 which is detachably fixed with non-shown means in casing 25.

Control valve 70 has at least one connection 69, e.g. for compressed air supply, as well as a connection 68 (shown in FIG. 2) for the electric power supply. The third chamber 32, which is diagonal to the first chamber 30, receives guide means 22 formed by tubular member 45 having a chamber 45' also shown in FIG. 3, and guide tube 50. The fourth chamber 33 receives the electric line or lines 61, which, on the one hand, are supplied through tube 60 to mounting element 90 and, on the other hand, during the reciprocating movement in the direction of arrow X, as indicated by the dot-dash line in FIG. 3, can be easily unrolled and protected against unintentional, external action on the partition 27 within chamber 33. Chambers 30 and 32 are filled with plastic foam material.

It is pointed out that the first chamber 30 for actuator 21 and the third chamber 32 for guide means 22 preferably undergo foaming for damping or absorbing any vibrations which occur and the casing 25, is e.g. produced by extrusion, preferably from light metal.

For damping the linear movement in the particular end position, a bearing bush 65, 65', which limits the stroke or travel is provided on both the casing 75 of the mounting element 90 and on the end piece 55 and is fitted by non shown means. Corresponding to the particular bearing bush 65 or 65', a journal 64, 64' is provided on each of the two flanges 35, 35'. The journals 64, 64' engage in the bearing bushes 65, 65' in the end position, whereby said bushes are provided with corresponding damping means, preferably solid shock absorbers (not shown). On each of the bearing bushes 65, 65' is also provided a circular disk 66, 66' and for the better guidance of the mounting element 90 and end piece 55, the disks have a corresponding construction in their outer region for operative connection with the guide tube 50 and piston rod 42.

Figure 5:
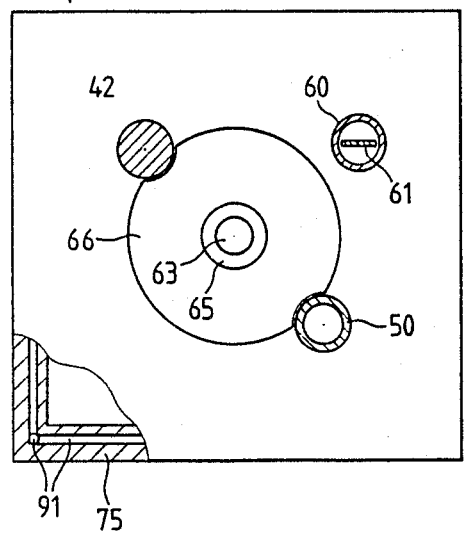
FIG. 5 is a section taken along line V—V of FIG. 3, on enlarged scale.

FIG. 5 shows a section along line V-V of FIG. 3, and it is possible to see the partly broken away casing 75 of mounting element 90, piston rod 42, the first guide tube 50 substantially diagonal to piston rod 42, the tube 60 for receiving the electric line 61 and simultaneously serving as a guide, the disk 66 for guiding parts 42 and 50 and the bearing bush 65 having an opening 63 for journal 64 (not shown in FIG. 5).

The mode of operation of the aforementioned linear unit 20 in conjunction with the actuating and guide means 21, 22 and the mounting element 90 will now be described. Starting from a non-shown basic position of the mounting element 90 with respect to the linear unit 20, for the movement in arrow direction X in per se known manner, an external, not shown signal generator supplies a first electrical signal to the control valve 70 via its electric connection 68. The connection 69 connects valve 70 to a not shown compressed air or hydraulic system. As a result of this first signal, control valve 70 is actuated to supply compressed air in correspondingly controlled manner via a line 3 diagrammatically indicated in FIG. 4 and/or bore 2 or 2' to cylinder chamber 1 or 1' (FIG. 2), and consequently piston 41, together with piston 42 is correspondingly actuated for moving in arrow direction X.

For the operation of the gripper 95 or the like arranged on the mounting element 90, compressed air is supplied from the mains connection of control valve 70 by means of line 4 diagrammatically shown in FIG. 4 and correspondingly associated bores 5, 5' to the connecting pieces 49, 49' of chamber 45' of tubular member 45 also shown in FIG. 3. Guide tube 50 positioned in chamber 45 contains at least one bore 48 connected to the through-bore 47 oriented in the axial direction of the guide tube 50. By means of the two bores 48, 47, the pressure in chamber 45' can build up into a duct system 91 formed in the casing 75 of the mounting element 90 (FIG. 3), the duct system 91 being connected to the individual micro-control valves 80.

For the operation of the gripper 95 a corresponding signal received by control valve 70 is transmitted, by means of the electric line 6 shown by broken lines in FIG. 4 and line 61 connected thereto (FIG. 3), to the micro-control valves 80, so that e.g. the movement Z in FIG. 1 or some other not shown movement, e.g. a gripping movement or the like can be performed by gripper 95.

What is claimed is:

1. Linear unit, particularly for an assembly device electrically/pneumatically or electrically/hydraulically operatively connected to an energy source and including a mounting element (90) with a handling gripper (95) thereon, the linear unit (20) comprising a casing (25), an actuator (21) positioned in the casing and including a cylinder tubular body (40), a piston (41) and a piston rod (42) mounted in said body, and guide means (22) including a guide tube (50) extending axially parallel to the piston rod (42) for cooperating with the mounting element (90) to be correspondingly controlled, whereby said gripper on said mounting element performs movement and/or handling sequences, wherein the linear unit (20) and the mounting element (90) are operatively connected with a control valve (70) mounted in the casing (25), and wherein:
   (a) the actuator (21) is formed as a piston/cylinder unit and is supplied with pneumatic or hydraulic energy by means of a first duct system integrated in the casing (25);
   (b) the mounting element (90) is supplied with pneumatic or hydraulic energy by means of a second duct system also integrated in the casing (25) and in the guide means (22);
   (c) electric power can be supplied to the mounting element (90) by means of a cable (61) operatively connected thereto and integrated into a guide tube (60) of said actuator and therefore said mounting element is substantially linearly adjustable; and
   (d) said second duct system for pneumatic or hydraulic energy supply of the mounting element (90) includes a tubular member (45) having a chamber (45') operatively connected to said control valve via a distribution line (4) and control valve openings (5, 5') provided in said casing (25) and in the tubular member (45), the guide tube (50) of said guide means axially penetrating the tubular member (45) and provided with an axially extended through-bore (47) which is connected by means of at least one radially directed bore through said guide tube of said guide means (48) to the chamber (45') of said tubular member, said guide tube of said guide means being operatively connected to a third duct system (91) formed in a casing (75) of the mounting element (90).

2. Linear unit according to claim 1, wherein the casing (25) is subdivided into several, longitudinally oriented chambers (30, 31, 32, 33) separated from each other by partitions (26, 26' and 27, 27'), for the installation of the actuator, the guide means (21, 22), the control valve (70) and the guide tube (60) of said actuator with the cable (61).

3. Linear unit according to claim 1, wherein said first duct system includes a distribution line (3) and control valve openings (2, 2') formed in said casing (25) and connected to said distribution line (3), and chamber (1, 1') formed in said piston/cylinder unit on each side of said piston (41).

4. Linear unit according to claim 1, wherein the mounting element (90) has a casing (75) formed for receiving control valves (80), which are electrically connected to the cable (61) and pneumatically or hydraulically to the second duct system.

5. Linear unit according to claim 4, wherein the electric power can be supplied to the cable (61) via a line (6) integrated in the casing (25) of the linear unit and connected through the guide tube (60) of said actuator to the control valves (80).

6. Linear unit according to claim 4, wherein the control valves (80) are connected to said third duct system (91).

7. Linear unit according to claim 2, wherein one of said chambers (30) provided in the casing (25) for the actuator (21) and another of said chambers (32) provided in the casing for the guide means (22) are filled with a plastic foam material.

8. Linear unit according to claim 1, wherein the casing (25) is produced by extrusion from light metal.

9. Linear unit according to claim 1, wherein said control valve is a single valve for performing a pneumatic or hydraulic control of the linear unit (20) and wherein said control valve includes an electrical connection (68).

10. Linear unit according to claim 4, wherein said control valves (80) are micro-control valves.

* * * * *